US011459257B1

(12) United States Patent
Troy

(10) Patent No.: US 11,459,257 B1
(45) Date of Patent: Oct. 4, 2022

(54) METHOD OF TREATING A LIQUID WITH NANOBUBBLES

(71) Applicant: Robert W. Troy, Houston, TX (US)

(72) Inventor: Robert W. Troy, Houston, TX (US)

(73) Assignee: Eco Environmental, LLC, Houston, TX (US)

( * ) Notice: Subject to any disclaimer, the term of this patent is extended or adjusted under 35 U.S.C. 154(b) by 376 days.

(21) Appl. No.: 15/977,311

(22) Filed: May 11, 2018

Related U.S. Application Data

(60) Provisional application No. 62/602,958, filed on May 12, 2017.

(51) Int. Cl.

| | | |
|---|---|---|
| *C02F 9/02* | (2006.01) | |
| *C02F 1/52* | (2006.01) | |
| *C02F 1/24* | (2006.01) | |
| *C02F 1/62* | (2006.01) | |
| *C02F 9/00* | (2006.01) | |
| *B01D 21/28* | (2006.01) | |
| *B01D 21/26* | (2006.01) | |
| *C02F 1/78* | (2006.01) | |
| *C02F 1/38* | (2006.01) | |
| *C02F 101/20* | (2006.01) | |
| *C02F 101/16* | (2006.01) | |
| *C02F 101/14* | (2006.01) | |
| *C02F 101/10* | (2006.01) | |
| *C02F 101/32* | (2006.01) | |
| *C02F 1/00* | (2006.01) | |

(52) U.S. Cl.
CPC .............. *C02F 9/00* (2013.01); *B01D 21/267* (2013.01); *B01D 21/283* (2013.01); *C02F 1/001* (2013.01); *C02F 1/24* (2013.01); *C02F 1/38* (2013.01); *C02F 1/52* (2013.01); *C02F 2101/101* (2013.01); *C02F 2101/105* (2013.01); *C02F 2101/14* (2013.01); *C02F 2101/163* (2013.01); *C02F 2101/166* (2013.01); *C02F 2101/20* (2013.01); *C02F 2101/322* (2013.01)

(58) Field of Classification Search
CPC .... C02F 1/64; C02F 1/001; C02F 9/00; C02F 1/38; C02F 1/52; C02F 2101/20; C02F 2101/163; C02F 2101/166; C02F 2101/14; C02F 2101/101; C02F 2101/322; C02F 1/24; C02F 1/62; B01D 21/283; B01D 21/267
USPC .......................... 210/760, 705, 702, 721, 722
See application file for complete search history.

(56) References Cited

U.S. PATENT DOCUMENTS

| | | | | |
|---|---|---|---|---|
| 4,555,335 A * | 11/1985 | Burris | ...................... | C02F 3/26 210/192 |
| 4,780,215 A * | 10/1988 | Carlson | ..................... | C02F 1/78 210/722 |
| 7,575,684 B2 * | 8/2009 | Yamasaki | ............. | C02F 3/1273 210/605 |
| 7,625,484 B2 * | 12/2009 | Yamasaki | ........... | B01F 3/04106 210/150 |
| 7,641,798 B2 * | 1/2010 | Yamasaki | ................. | C02F 3/20 210/615 |
| 8,317,165 B2 * | 11/2012 | Yamasaki | ........... | B01F 13/1016 261/26 |
| 8,906,241 B2 * | 12/2014 | Kerfoot | ..................... | C02F 1/78 210/747.8 |
| 9,845,253 B2 * | 12/2017 | Miller | ........................ | C02F 1/78 |
| 2014/0027388 A1 * | 1/2014 | Constant | ................... | C02F 1/78 210/760 |
| 2014/0263098 A1 * | 9/2014 | Abrams | ..................... | C02F 1/78 210/760 |
| 2015/0123295 A1 * | 5/2015 | Kerfoot | ............... | B01F 3/04985 261/93 |
| 2015/0368137 A1 * | 12/2015 | Miller | ........................ | C02F 1/66 210/638 |
| 2019/0118142 A1 * | 4/2019 | Earthman | ................ | C02F 1/441 |

FOREIGN PATENT DOCUMENTS

| | | | | |
|---|---|---|---|---|
| CA | 2921749 A1 * | 8/2017 | ................ | C02F 1/72 |
| DE | 4028045 A1 * | 3/1992 | ................ | C02F 1/78 |
| JP | 5037225 B2 | 9/2012 | | |
| JP | 2013180213 A * | 9/2013 | ......... | B01D 17/0205 |
| KR | 101252673 B1 * | 4/2013 | | |
| WO | WO 2016168943 A1 * | 10/2016 | | |

\* cited by examiner

*Primary Examiner* — Thomas M Lithgow
(74) *Attorney, Agent, or Firm* — Kearney, McWilliams & Davis; Erik J. Osterrieder

(57) ABSTRACT

A method of treating a liquid by creating nanobubbles of a desired gas within a target liquid and allowing the desired gas to react with a target component of the target liquid. The desired gas can be selected to be reactive with the target component, and a desired liquid can be formed after the desired gas reacts with the target component.

20 Claims, No Drawings

METHOD OF TREATING A LIQUID WITH NANOBUBBLES

CROSS REFERENCE TO RELATED APPLICATION

The present application claims priority and the benefit of U.S. Provisional Patent Application Ser. No. 62/602,958 filed on May 12, 2017, titled "USE OF MICRO AND NANO BUBBLES TO ADD WATER CLARIFICATION USING MAGNETIC BALLAST AND DESALINIZATION ON PRODUCED WATER USING THE SOLVAY OR LEBANG PROCESS TO CREATE COMMERCIAL PRODUCTS". This reference is incorporated herein in its entirety.

FIELD

The present disclosure generally relates to a method for treating a liquid with nanobubbles for the purpose of removing impurities or otherwise altering its chemical composition.

BACKGROUND

It is often desirable to treat a liquid in order to adjust or alter its chemical composition. Impurities may need to be removed from the liquid, or an increased concentration of a dissolved solute may be desired.

A typical example of such an application is wastewater treatment. It is desirable to remove impurities to make water potable or otherwise usable.

The present disclosure relates to a method for treating a liquid with nanobubbles for the purpose of removing impurities or otherwise altering its chemical composition.

Bubbles are gas filled cavities that can form in liquids or solids. The present disclosure deals with bubbles in liquids and/or substances that behave somewhat like liquids, such as emulsions or gels. For the sake of brevity, this disclosure shall intend for the term liquid to include liquids, gels, emulsions, or other fluid substances that will take the shape of their container without substantially expanding in volume to do so.

The terms microbubbles and nanobubbles have been used for extremely small bubbles. For the purposes of this disclosure, the term nanobubble shall be used to describe any bubble less than one micron ($\mu$) or 1000 nanometers (nm).

Recent improvements have led to feasible production of nanobubbles of desired characteristics. The present disclosure relates to a method for using specific nanobubbles to purify, or otherwise change the composition of a liquid.

DETAILED DESCRIPTION OF THE EMBODIMENTS

Before explaining the present disclosure in detail, it is to be understood that the disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The embodiments of the present disclosure generally relate to a method for treating a liquid with nanobubbles for the purpose of removing impurities or otherwise altering its chemical composition.

A method of treating a liquid by creating nanobubbles of a desired gas within a target liquid and allowing the desired gas to react with a target component of the target liquid. The desired gas can be selected to be reactive with the target component, and a desired liquid can be formed after the desired gas reacts with the target component.

Bubbles are cavities of gas within liquids and solids. Large bubbles within liquid typically rise rapidly and directly to the surface. Nanobubbles are very small bubbles that have diameters of less than 1 micron ($\mu$). Nanobubbles can be stable for long periods of time within a liquid and do not rapidly rise to the surface as do larger bubbles due to a lesser degree of buoyancy and due to Brownian motion effects.

As the internal pressure of a bubble is dependent upon the bubble diameter, smaller bubbles have higher internal pressure and can release gas into the surrounding liquid. Nanobubbles have a tendency towards self-organization in much the same way as charged oil-water emulsions, colloids, and nanoparticles. This is due to a combination of their negative charge and long-range attraction.

Because of these characteristics of nanobubbles, a desired gas can be introduced to a liquid, which then is stable until finding a target component to react with. Because of the small size of the nanobubbles, a much greater surface area of the bubbles per a given volume is realized, thus providing a large area for reactions to occur between the desired gas and the target component.

The method can be implemented to purify water, adjust the chemical concentration of a liquid, remove impurities, and the like.

In embodiments, the desired gas reacts with the target component to form a potable component, a chemically stable component, or a precipitate.

The method can also include the steps of filtering the target liquid prior to creating nanobubbles of a desired gas within the target liquid and filtering the desired liquid after introducing the nanobubbles. Any formed precipitate can be removed by this filtering process.

Exemplary desired gases include, but are not limited to: ammonia, ozone, chlorine, sulfur dioxide, a carbonate, an oxide, or carbon dioxide. Gases can be selected based upon their reactivity with the target component in the target liquid. Any gas appropriate to the chosen application can be selected by persons having ordinary skill in the art.

Exemplary target components include, but are not limited to: a monovalent salt, a divalent salt, other salts, a chloride, a nitrate, a nitrite, a fluoride, a bromide, a phosphate, a sulfate, a volatile organic chemical (VOC), mercury, or a metal.

A waste water treatment example is provided below:

Waste water from various sources, such as effluent generated by oil and gas operations can be treated using the method of the present disclosure.

In this embodiment, the target liquid (effluent) can be filtered prior to the introduction of nanobubbles. First, a shaker can be employed to remove large particles or clumps of material. Then one or more hydro cyclone separators can be employed to remove particles greater than 80 to 100 microns in size.

In shakers, the fluid is fed over a mesh screen whereby the fluid passes through and particles of a great size are retrained by the mesh screen for disposal.

In hydro cyclone separators, a liquid stream is fed tangentially into an upper cylindrical portion where the liquid is accelerated in a spiral as the liquid flows through a conical lower portion. As the liquid spirals, centrifugal forces draw the denser components to the outer portion of the rotating column of liquid and the less dense components of the liquid migrate to a central column area. The dense components are discharged through a lower underflow opening in the conical lower portion and the less dense components are passed upwardly through a centrally located overflow opening or outlet.

After initial filtration, nanobubbles with a desired gas are introduced into the solution to react with target components and form a precipitate that drops out of solution or react with flocculate as desired. The precipitate or flocculate can then be coagulated using any means known to persons having ordinary skill in the art.

The effluent can be again filtered to remove the coagulated precipitate/flocculant, thereby resulting in a desired liquid.

While the present disclosure emphasizes the embodiments, it should be understood that within the scope of the appended claims, the disclosure might be embodied other than as specifically described herein.

What is claimed is:

1. A method of treating a liquid comprising:
   a. creating nanobubbles of the desired gas within the liquid, wherein the desired gas comprises ammonia;
   b. flocculating;
   c. allowing the desired gas to chemically react with a target component of the liquid, wherein the target component comprises salt; and
   d. forming, subsequent to the allowing, at least a precipitate and a desired liquid,
   wherein the nanobubbles of the desired gas have no charge.

2. The method of claim 1, wherein the desired gas chemically reacts with the target component to form a potable component.

3. The method of claim 1, wherein the desired gas chemically reacts with the target component to form a chemically stable component.

4. The method of claim 1, further comprising filtering the liquid prior to the creating nanobubbles of the desired gas within the liquid.

5. The method of claim 1, further comprising filtering the desired liquid.

6. The method of claim 1, further comprising shaking with one or more shakers to remove particles and/or clumps in the liquid to yield the desired liquid or a precursor thereof.

7. The method of claim 6, further comprising hydrocycloning the precursor with one or more hydrocyclone separators to yield a refinement of the precursor.

8. The method of claim 7, further comprising separating at least the precipitate and coagulated flocculants from the refinement to yield the desired liquid.

9. The method of claim 8, wherein the desired liquid is potable.

10. The method of claim 8, wherein the refinement comprises at least 95% turbidity removal.

11. The method of claim 1, wherein the flocculating comprises using polyaluminum chloride and sodium oleate.

12. The method of claim 1, wherein the flocculating comprises using at least a polymer and a ferromagnetic material.

13. The method of claim 1, further comprising recovering, subsequent at least to the flocculating and the allowing, one or more flocculating and/or coagulating agents used in the flocculating.

14. The method of claim 13, wherein the recovering further comprises agitating the liquid to form a suspension where ferromagnetic particles and suspended solids exist separately.

15. The method of claim 14, wherein the recovering further comprises removing the ferromagnetic particles and the suspended solids.

16. The method of claim 1, wherein the flocculating occurs during the creating.

17. The method of claim 1, wherein the flocculating occurs subsequent to the creating.

18. The method of claim 1, wherein the salt is a monovalent salt.

19. The method of claim 1, wherein the salt is a divalent salt.

20. A method of treating a liquid comprising:
   a. creating nanobubbles of the desired gas within the liquid, wherein the desired gas comprises ammonia;
   b. flocculating;
   c. allowing the desired gas to chemically react with a target component of the liquid, wherein the target component comprises salt; and
   d. forming, subsequent to the allowing, at least a precipitate and a desired liquid,
   wherein the nanobubbles of the desired gas are charged.

* * * * *